Feb. 7, 1956 R. L. MILLER 2,733,607
RELATIVE HUMIDITY MEASURING APPARATUS
Filed Sept. 12, 1951 2 Sheets-Sheet 1
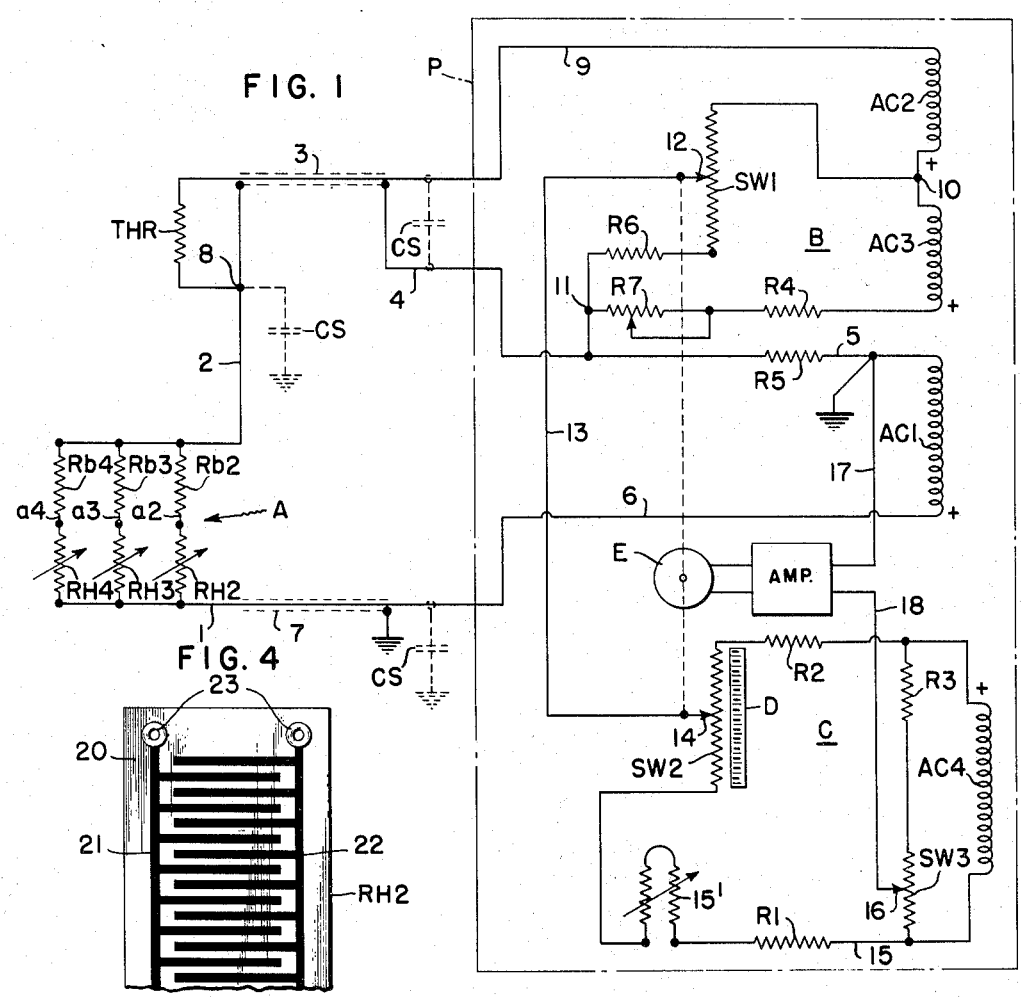
INVENTOR.
ROBERT L. MILLER
BY Arthur H. Swanson
ATTORNEY.

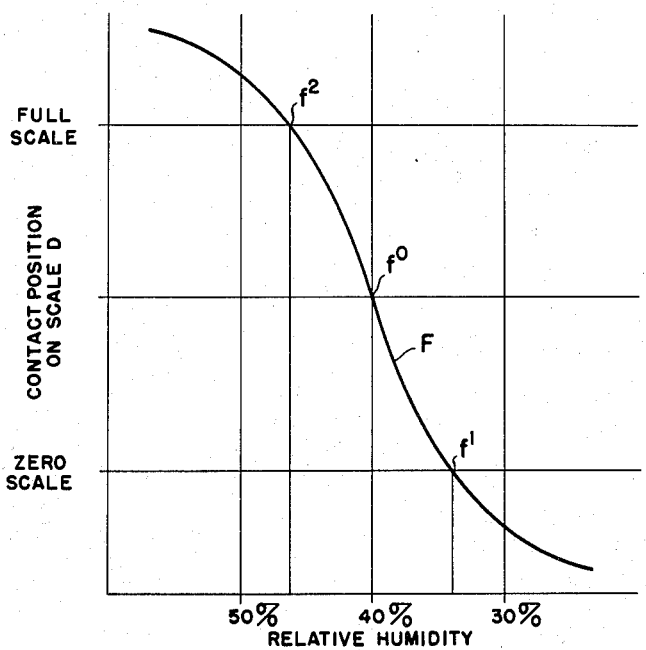
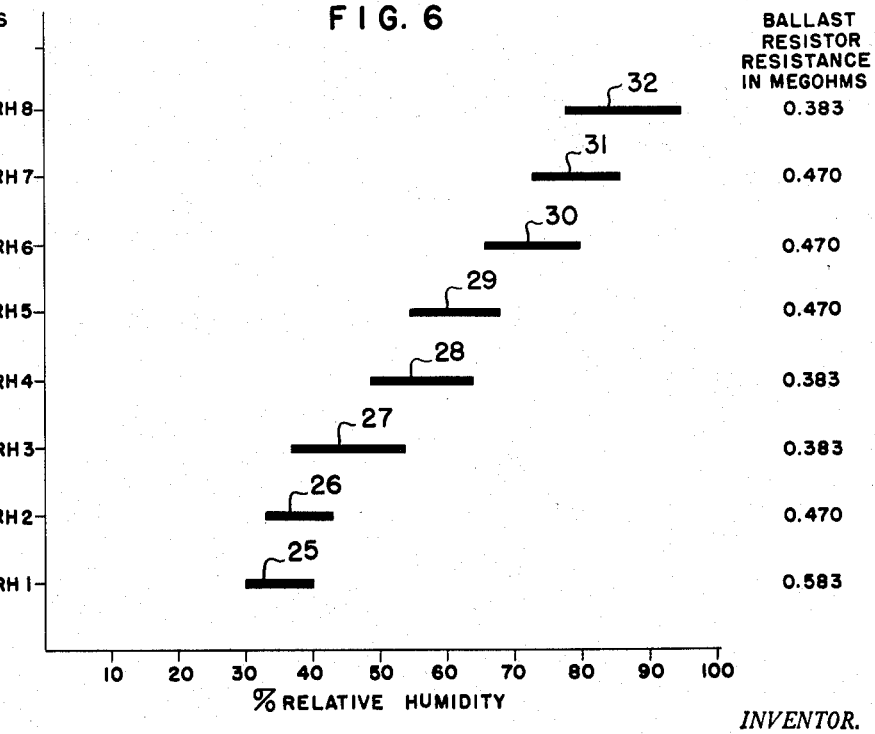

United States Patent Office 2,733,607
Patented Feb. 7, 1956

2,733,607

RELATIVE HUMIDITY MEASURING APPARATUS

Robert L. Miller, Philadelphia, Pa., assignor to Minneapolis-Honeywell Regulator Company, Minneapolis, Minn., a corporation of Delaware Application September 12, 1951, Serial No. 246,254

19 Claims. (Cl. 73—335)

The general object of the present invention is to provide an improved apparatus for measuring relative humidity by mechanism automatically responsive to variations in the resistance of relative humidity elements, each of which comprises metallic conductors electrically connected by a hygroscopic coating or film. The fact that the resistance of such an element is an exponential function of the relative humidity has long been known, but the first electrical measuring instrument operative to provide continuously a linear measure of relative humidity varying through a substantial range has been put on the market only within the last year or so. That instrument makes use of inventions disclosed and claimed in Patent No. 2,707,880 which issued on the application of William H. Wannamaker, Jr., Serial No. 144,996, filed February 18, 1950, and in Patent No. 2,689,479 which issued on the application of Richard S. Feigal, filed November 28, 1950, and given Serial No. 198,000.

An object of the present invention is to combine in an effective manner inventive features disclosed in said prior applications with improved apparatus for automatically compensating for the effect of changes in the temperatures of the relative humidity elements on the resistances of those elements. The present invention is specifically characterized by the effective and relatively simple circuit network in which a plurality of relative humidity sensitive resistor elements and a thermometric resistor are combined with a potentiometric bridge circuit and with a reversible alternating current motor for adjusting wiper contacts along slide wires to measure relative humidity continuously, and, if desired, to produce control effects dependent upon the variations in the relative humidity measured.

Another object of the invention is to include shielded conductors in circuit with the relative humidity sensitive apparatus and measuring instrument which are adapted to permit said apparatus to be connected to the measuring instrument proper by relatively long leads without giving rise to seriously objectionable capacitance or pick-up difficulties.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1 is a circuit diagram illustrating a desirable embodiment of the present invention;

Fig. 2 is a schematic diagram illustrating the temperature compensating section of Fig. 1;

Fig. 3 is a schematic diagram illustrating the relative humidity measuring section of Fig. 1;

Fig. 4 is a perspective view of a relative humidity sensing element;

Fig. 5 is a curve illustrating the relation between the position of the potentiometric rebalancing slidewire contact and the relative humidity measured by one of the sensitive elements; and Fig. 6 is a diagram illustrating the respective relative humidity range measuring capacities of a plurality of selected relative humidity sensing elements adapted for use separately or collectively.

The desirable embodiment of the invention diagrammatically illustrated by way of example in the circuit network shown in Fig. 1 comprises relative humidity sensitive apparatus A, a thermometric, temperature sensitive resistor THR, and self-balancing measuring apparatus including a scale D and a rebalancing measuring motor E for continuously measuring the relative humidity of the atmosphere to which the apparatus A is exposed, with compensation for variations in the temperature of said atmosphere. The resistor THR may be a nickel wire or analogous resistance thermometer element.

The network shown in Fig. 1 comprises a main circuit in which the relative humidity sensitive apparatus A is connected in series with a resistor R5 of small resistance across a source of alternating current AC1. Associated with the main circuit is a temperature compensating circuit in which the temperature sensitive resistor THR is connected in series with a closed potentiometric circuit B across a source AC2 of alternating current. The circuit B includes a plurality of resistors connected in series with one another across a third alternating current source AC3. The Fig. 1 network also includes a self-balancing potentiometric measuring circuit C with resistors connected across a fourth alternating current source AC4. The circuits B and C include slide wire resistors SW1 and SW2, respectively engaged by wiper contacts 12 and 14. Those contacts are simultaneously adjusted by the rebalancing motor E under the control of an amplifier AMP having its input terminals connected between the main circuit and the measuring circuit as hereinafter explained.

The currents supplied by the sources AC1, AC2, AC3, and AC4, are of the same frequency and in such phase relation that the potentials of the lower ends of the sources AC1, AC2, and AC3 and of the upper end of the source AC4, as seen in Fig. 1, have the same instantaneous polarity. In practice, the current sources AC1, AC2, AC3, and AC4 may well be the secondary windings of a transformer having a single primary winding connected to a source of alternating current of sixty cycle frequency.

The apparatus A shown in Fig. 1 comprises three relative humidity units, $a2$, $a3$, and $a4$, connected in parallel between conductors 1 and 2 and collectively forming a composite relative humidity sensing arrangement. The unit $a2$ comprises a relative humidity sensing element RH2 and a ballast resistor R$b$2 connected in series therewith. Similarly, the element $a3$ comprises a relative humidity sensing element RH3 and a ballast resistor R$b$3 connected in series therewith, and the element $a4$ comprises a relative humidity sensing element RH4 and a ballast resistor R$b$4 connected in series therewith. The conductor 2 connects the units $a2$, $a3$, and $a4$ to one end of the shield 3 of a shielded conductor 9. The shield 3 has its other end connected by a conductor 4 to one terminal of the resistor R5. The second terminal of the resistor R5 is connected by a conductor 5 to ground and to one terminal of the current source AC1. The latter has its second terminal connected by a conductor 6 to the conductor 1. As shown, the latter is provided with a shield 7 which is connected to ground.

The thermometric resistor THR and the potentiometer circuit B are connected in a closed temperature compensating section of the main circuit network, separately shown in the schematic diagram of Fig. 2. As shown in Fig. 1, one terminal of the resistor THR is connected to the conductor 2 at the point 8, and the other terminal of that resistor is connected by the shielded conductor 9 to one terminal of the current source AC2. The second terminal of the latter is connected to the potentiometer circuit B at the point 10, and the point 11 of the circuit B is connected to the conductor 4 and thereby to the shield 3 and through the latter to the point 8.

The circuit B comprises two circuit branches between points 10 and 11. One of those branches includes the slide wire resistor SW1 and a resistor R6 connected in series. The second branch includes the current source AC3 and resistors R4 and R7 connected in series therewith.

The measuring circuit section C included in Fig. 1 is schematically illustrated separately in Fig. 3. The measuring circuit C is a potentiometric circuit forming a part of the self-balancing measuring unit which directly measures changes in the difference between the potential of the wiper contact 12, engaging and adjustable along the slide wire resistor SW1, and the potential of the conductor 5. The wiper contact 12 is connected by a conductor 13 to the wiper contact 14 which engages and is adjustable along the slide wire resistor SW2 included in the bridge circuit C. The slide wire resistor SW2 is connected through a resistor R2 to one terminal of the source of alternating current AC4. The latter has its second terminal connected by a series connected conductor 15, a resistor R1, and an adjustable span regulating resistor 15′ to the second terminal of the slide wire resistor SW2. The bridge circuit C also includes a shunt which is connected across the current source AC4 and comprises a series connected slide wire resistor SW3 and a resistor R3. A wiper contact 16, engaging and manually adjustable along the slide wire resistor SW3, is connected to the grounded conductor 5 through the input circuit of the amplifier AMP. The latter has input terminals or conductors 17 and 18 connected to the conductor 5 and to the wiper contact 16, respectively.

The adjustment of the contact 14 along the slide wire resistor SW2 is a rebalancing adjustment automatically effected by the reversible alternating current motor E controlled by the amplifier AMP. In the balanced condition of the apparatus shown in Fig. 1, there will be no potential difference between the amplifier input terminals 17 and 18, and the motor E will be stationary. On the development of a potential difference between the terminals 17 and 18, the motor E will be energized for operation in a direction and to an extent respectively dependent upon the phase and magnitude of the signal then impressed on the amplifier input circuit. Ordinarily, after its operation is initiated, the motor E continues to operate until the measuring circuit is rebalanced.

The resistance of the temperature sensitive resistor THR varies in response to changes in the temperature to which it is exposed. The resistor THR and the relative humidity elements RH2, RH3, and RH4 are all subjected to the same temperature conditions, and, in the circuit arrangement shown in Fig. 1, the motor E operates, when rotating, to adjust the wiper contact 12 simultaneously with and proportionally to its adjustment of the wiper contact 14. Such operation of the motor E is made practically possible by the fact that the resistance of the resistor THR varies in substantially linear accordance with the variations in resistance of the apparatus A produced by variations in the temperature of that apparatus.

For operation in the manner described, the motor E with its controlling amplifier AMP may well be of the well known and widely used type disclosed and claimed in the Wills Patent 2,423,540 of July 8, 1947, and therefore requires no further description herein. Quite commonly, an instrument of the Wills patent type, when effecting its rebalancing operations, also adjusts a recorder element and an indicating pointer, and in many cases also adjusts control elements. For example, the motor E herein may well operate in some cases to vary the supply of moisture to the atmosphere enveloping the elements RH2, RH3, and RH4 as required to maintain an atmosphere having an approximately constant relative humidity.

The relative humidity sensing elements RH2, RH3, and RH4 are shown in Fig. 4 as being of a commercially available type, each comprising a plastic, slab-like body 20 having two gold-leaf grids 21 and 22 stamped on one side of the body. Each of said grids is a comb-shaped conductor having its teeth alternating with the teeth of the other grid, and having a terminal portion 23 of eyelet type. The grid-carrying side of the plastic slab 20 is coated with lithium chloride or other suitable hygroscopic material. Each of said relative humidity sensing elements has a high impedance which ordinarily is in excess of 300,000 ohms when the element is responding to a relative humidity in about the middle of the effective humidity measuring range for that particular element. In the lower portion of the effective measuring range of the element, its resistance increases to about 3 megohms. As the relative humidity to which the element is exposed continues to decrease, the resistance of the element increases further, but element resistances above 3 megohms do not constitute reliable measures of relative humidity with the present apparatus. While the different elements RH2, RH3, RH4, and other elements of a series hereinafter mentioned, are all similar in form and structure, they differ from one another in the salt concentrations in their respective coatings, and therefore differ from one another in their resistances when at the same relative humidity.

As is well known, the log to the base 10 of the resistance of each of the different sensing elements RH2, RH3, and RH4 varies in linear proportion to the variations in the relative humidity of the atmosphere to which the resistor is exposed throughout the range of the element. When each of said sensing elements RH2, RH3, and RH4 is connected in series with a suitable ballast resistor $Rb2$, $Rb3$, and $Rb4$, respectively, to the potentiometric measuring apparatus C, the position of the contact 14 along the scale D will vary in substantially linear proportion to the relative humidity of the atmosphere to which the element is exposed over a predetermined relative humidity range. A suitable ballast resistor for a particular relative humidity sensing element is a resistor having a resistance approximately equal to the resistance of the element when the latter is in about the middle of its effective relative humidity measuring range.

In Fig. 5, I have shown by way of example a curve F illustrating the general manner in which the position of the contact 14 varies along the scale D as the relative humidity of the element RH2 varies through its assumed measurable relative humidity range of from 34% to 46%, approximately. The curve F is a reversed, S-shaped curve comprising an approximately linear intermediate portion between the points $f'$ and $f^2$, which portion represents or indicates variations in the contact position between zero scale and full scale positions as the relative humidity to which the element RH2 is exposed varies from 34% to 46%, approximately. The point of inflection $f^0$ of the curve F is shown as lying midway between the points $f'$ and $f^2$, and thus indicates the midpoint of the effective relative humidity measuring range of the element RH2.

The composite relative humidity sensing element formed by the apparatus A shown in Fig. 1 may, and is herein assumed to, comprise sensing elements RH2, RH3, and RH4 which successively vary through their respective effective measurable resistance ranges of from about 0.07 megohm to about 3.0 megohms as the relative humidity of the atmosphere to which the composite element is exposed varies through a relative humidity range of from 34% to 68%, approximately.

The present invention includes novel and effective means for compensating for the effects of changes in the temperature of the apparatus A on the relative humidity measurements. The compensating apparatus, shown in schematic form in Fig. 2, comprises a circuit in which the voltage imposed on the temperature responsive resistor THR tends to create a current flow $i2$ through that resistor which may be conveniently thought of as including a constant component and a component which varies with the temperature to which the resistor THR and the apparatus A are subjected. In Fig. 2, the current source AC2 tends to pass a current $i2$ through the circuit branch including the resistors SW1 and R6 which is opposite in direction to the current $i3$ which the current source AC3 tends to pass through the last mentioned resistors. By suitably proportioning the potentiometric circuit B, the current $i3$, flowing through the resistors SW1 and R6 may be made equal to the constant component of the current $i2$. This eliminates the tendency to zero shift which would occur if the only current flowing in the circuit shown in Fig. 2 were the current $i2$ with its constant and variable components. The resultant of the opposing currents $i2$ and $i3$ may be varied as required to eliminate the constant current component of $i2$ by adjusting the resistance of the variable resistor R7.

In the normal operation of the apparatus shown in Fig. 1, the measuring circuit C responds to variations in the potential difference between its input conductors 13 and 17, i. e., to variations in the difference between the potential of the wiper contact 12 and the potential of the grounded end of the resistor R5. The voltage difference between the contact 12 and the grounded end of the resistor 5 is thus the alegbraic sum of two potential drops: namely, the potential drop in the resistor 5 and the potential drop in the circuit branch which connects the point 11 and contact 12 and which includes the resistor R6 and the portion of the resistor SW1 below the contact 12. In the circuit branch including the resistors R5 and R6 and a portion of the resistor SW1, the voltage drop in the resistor R5 and the voltage drop between the point 11 and the wiper contact 12 are added algebraically in the input of the amplifier AMP.

The voltage drop between the point 11 and the wiper contact 12 thus compensates for the effect on the resistor R5 of changes in the temperature of the sensing elements RH2, RH3, and RH4. Such compensation is necessary since an increase or decrease in the temperature of the apparatus A with no change in the relative humidity makes the resistance of that apparatus smaller or greater than it should be. The apparatus shown in Fig. 1 would thus indicate a relative humidity greater or less than the actual relative humidity, were it not for the effect of the resistor THR and the associated compensating apparatus.

I have discovered, moreover, that the response of the relative humidity sensing apparatus to changes in its temperature is varied by changes in the existing relative humidity, which means that the resistance changes experienced by the sensing elements upon changes in their temperature are different for different values of the relative humidity to which the elements are exposed. That is to say, the resistance-temperature characteristic response of the sensing elements is modified by changes in the relative humidity sensed by the elements. In other words, for a given relative humidity, a given temperature will cause any one of the sensing elements to have a certain resistance, and a given temperature change will produce a certain change in the element resistance. However, for a different relative humidity, the same temperature as above will cause the element to exhibit a different resistance, and the same temperature change as above will produce a different change in the element resistance. Accordingly, accurate compensation for resistance changes within the sensing elements due to temperature changes can be provided only when the temperature compensation is varied as the humidity measured by the elements varies.

To this end, I provide in the circuit B of Fig. 1 the slide wire resistor SW1 with its contact 12 adjusted by the motor E in accordance with the measured relative humidity. Accordingly, the output of the circuit B, appearing between the contact 12 and point 11, is a temperature compensating signal which includes a component variable with the temperature of the sensing elements and the resistor THR and a component variable with the relative humidity as determined by the position of the contact 12. This compensating signal is operative, therefore, to compensate for the component of the sensing apparatus signal appearing across the resistor R5 which is due to the temperature of the sensing apparatus and which is modified by the relative humidity, thus leaving for application to the input of the amplifier AMP only the component of the sensing apparatus signal which is due to the relative humidity to be measured.

The apparatus disclosed herein is also characterized by the manner in which a multiplicity of relative humidity responsive elements, differing from one another in respect to their response to relative humidity changes, may be combined for use in the same measuring instrument under widely different operating conditions. Thus, for example, the elements RH2, RH3, and RH4, shown in Fig. 1, may and are assumed to be selected elements of a series of eight relative humidity sensing elements RH1 through RH8. Those elements, when associated with respectively suitable ballast resistors, are adapted to measure accurately relative humidities varying from 35% to 93%, approximately. In Fig. 6, the horizontal lines 25 through 32, respectively, represent the individual response ranges of the different relative humidity elements designated by the symbols RH1 through RH8 shown at corresponding levels in the column at the left-hand side of Fig. 6. As shown in Fig. 6, adjacent individual response ranges overlap to substantial extents.

Such range overlapping is practically desirable, since the measurements obtainable in the end portions of each of the ranges 25 through 32 are less accurate than the measurements obtained in the intermediate portions of the ranges. Moreover, the measurements obtained by the conjoint use of two elements having overlapping ranges are more accurate than the measurements obtainable by the use of only one of each pair of overlapping range elements. What has just been said explains why the accurately measurable relative humidity range of the eight elements is stated to be from 35% to 93%, although the overlapping range lines 25 through 32 appear to indicate a total relative humidity range of from 30% to 95%.

The figures in the column at the right-hand side of Fig. 6 indicate the ideal resistance values of the ballast resistors $Rb1$ through $Rb8$ which are respectively associated with the resistors RH1 through RH8.

The series of eight relative humidity sensing elements referred to in Fig. 6 may advantageously be used to form one or more composite elements. Thus, for example, all eight elements connected in parallel may replace the three elements shown in Fig. 1, and may thus form a composite sensing element adapted for use in measuring relative humidity over the range of 35% to 93% on a linear scale D with a maximum error of 1%.

The resistances of the ballast resistors $Rb1$ through $Rb8$, respectively associated with the eight different elements RH1 through RH8 in the composite element including those eight elements, are given in the following table A:

Table A

| Sensing Element | Ballast Resistor, Resistance in Megohms |
| --- | --- |
| RH1 | 0.583 |
| RH2 | 0.470 |
| RH3 | 0.383 |
| RH4 | 0.383 |
| RH5 | 0.470 |
| RH6 | 0.470 |
| RH7 | 0.479 |
| RH8 | 0.383 |

The resistances of pertinent instrument resistors used in the apparatus including the eight relative huimidity elements and associated ballast resistors of table A are given in the following table B:

Table B

Instrument resistor resistances:
   R1 resistance is 2.0 ohms
   R2 resistance is 123.7 ohms
   R3 resistance is 391.0 ohms
   R4 resistance is 570.0 ohms
   R5 resistance is 500.0 ohms
   R6 resistance is 7.45 ohms
   SW1 resistance is 7.93 ohms In the use of the composite sensing element including the eight elements RH1 through RH8, the resistance of the composite element decreases rapidly as the relative humidity to which the element is exposed increases. Thus, when the composite element is exposed to relative humidities of 35%, 50%, 70% and 90%, the resistance of the element in megohms is respectively 0.4350, 0.1564, 0.0840 and 0.0574.

In various commercial uses of relative humidity measuring and control apparatus, the relative humidity range of interest may be made quite narrow by the conditions of operation. Thus, in many industrial plants in which accurate relative humidity measurements are desirable, the conditions of operation are such that the maximum relative humidity variations will not be greater than 6% to 8% from a normal relative huimidity percentage, though the latter may be quite different in different plants. In each of most of the plants of the character just mentioned, the particular relative humidity range to be measured may well be covered by a composite sensing element comprising one or another of different groups of two or three of each of the eight elements RH1 through RH8.

Thus, for example, the eight elements RH1 through RH8, illustrated and described with reference to Fig. 6, may be combined in five groups to cover accurately variations in five different relative humidity ranges each of 16% or less, these ranges being included in an overall relative humidity range of from 40% to 93% as indicated in the following table C:

Table C

| Element Group | Relative Humidity Percentage Range | Elements in Group | Resistor R5 Resistances, ohms |
| --- | --- | --- | --- |
| 1 | 40–55 | RH2, RH3, RH4 | 410 |
| 2 | 49–65 | RH3, RH4, RH5 | 385 |
| 3 | 58–73 | RH4, RH5, RH6 | 410 |
| 4 | 68–83 | RH5, RH6, RH7 | 460 |
| 5 | 80–93 | RH6, RH8 | 570 |

To facilitate the assemblage of different measuring units of the general character shown diagrammatically in Fig. 1, and including different ones of the five element groups of table C, the circuit elements are so relatively proportioned that the ballast resistor used with each of the elements RH2 through RH8 may have the same resistance of 0.470 megohms. Further, in the use of the different element groups, the elements R1, R2, R3, R4, R6, and SW1 may have the same resistances of 4.0, 167.7, 175.0, 550.0, 7.75 and 3.44 ohms, respectively, in each of the five different instrument assemblages. In the original assembly of each instrument, factory adjustments of the span, zero, and temperature compensating circuit resistor R7 are made appropriate to the particular element group included in the instrument. If it subsequently becomes desirable to make a field replacement in an instrument of its original group of relative humidity sensing elements by another group of those elements, the resistor R5 may have to be replaced, and the instrument zero must be modified by an adjustment of the contact 16 along the slide wire resistor SW3.

In the particular arrangement shown in Fig. 1, the voltages of the voltage sources AC1, AC2, AC3, and AC4 are respectively 10 volts, 5 volts, 5 volts and 1 volt. In the Fig. 1 arrangement, the measuring circuit resistors SW2 and SW3 may have resistances of 20 ohms and 25 ohms, respectively.

The location of the ballast resistors adjacent the corresponding relative humidity resistors as shown in Fig. 1, coupled with the shields 3 and 7 for the leads 9 and 1, respectively, substantially eliminates the objectionable reactive current effects which would otherwise be present due to capacitance across the relative humidity sensing elements, even though the lead conductors extending between the sensing apparatus A and the instrument P are quite long. The lead resistance of the circuit including the sensing apparatus A is unimportant because it is negligible in any case in comparision with the resistance of the sensing apparatus A. The capacitance across the sensing apparatus is objectionable, however, as it may block the amplifier AMP by producing quadrature current through the resistor R5. Such detrimental capacitance action is avoided by using the coaxial or shielded lead sections as shown. The resulting capacitances CS, shown by dotted lines in Fig. 1, have no significant adverse effects on the operation of the arrangement shown in Fig. 1.

As will be apparent, the location of the relatively high ballast resistors in proximity to the various humidity sensing elements with which they are associated permits the shielded conductors to be located at a distance from the instrument P, and thus contributes to the avoidance of an objectionable reactive current flow which would adversely affect the signal impressed on the amplifier AMP. While lead resistance in the circuit including the apparatus A is unimportant, lead resistance in the compensating circuit must be kept low to avoid interference with the proper operation of that circuit. In practice, the compensating circuit is advantageously so designed that the total lead resistance is of the order of 10 ohms.

The use of the conductor shields illustrated in Fig. 1 minimizes the risk of objectionable stray pick-up effects. The use of a plurality of relative humidity sensing elements and their associated ballast resistors in parallel, as shown in Fig. 1, also contributes to the avoidance of objectionable pick-up problems by substantially reducing the impedance of the measuring circuit which the measuring instrument "looks into" to a relatively low and fixed ohmic resistance. As will be recognized, in the normal use of apparatus of the character shown in Fig. 1, the relatively high relative humidity sensed by one of the three parallel units of Fig. 1, under any normal operating condition for said units, insures a relatively low aggregate resistance of the three parallel units and a relatively small variation in that aggregate resistance.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In combination, relative humidity sensing apparatus responsive both to the relative humidity and to the temperature to which it is exposed, a sensing circuit including said apparatus and having a pair of conductors between which there is developed a first electrical effect including a relative humidity component varying with said relative humidity and a temperature component varying with said temperature, a thermometric resistor responsive to said temperature, a compensating circuit including said resistor and having a pair of conductors between which there is developed a compensating electrical effect including a variable component varying with said temperature and tending to include a constant component, means connected to said compensating circuit and arranged to apply thereto a neutralizing electrical effect in opposition to said constant component to effect substantially complete neutralization of the latter in said compensating circuit, electrical measuring apparatus having an input, and connecting means to oppose said variable component of said compensating electrical effect to said first electrical effect in said input of said measuring apparatus for the substantially complete cancellation of said temperature component of said first electrical effect by said variable component of said compensating electrical effect, said measuring apparatus thereby responding solely to said relative humidity component of said first electrical effect.

2. A combination as specified in claim 1, wherein said input of said measuring apparatus includes first and second input connections, and wherein said connecting means comprises a connection between one of said conductors of said sensing circuit and one of said conductors of said compensating circuit, a connection between the other of said conductors of said sensing circuit and one of said input connections, and a connection between the other of said conductors of said compensating circuit and the other of said input connections.

3. A combination as specified in claim 1, wherein the response of said relative humidity sensing apparatus to said temperature is varied by changes in said relative humidity, wherein said temperature component of said first electrical effect varies with said relative humidity as well as with said temperature, and wherein said compensating circuit includes variable means connected to said conductors of said compensating circuit and arranged to be varied in accordance with said relative humidity and to render said variable component of said compensating electrical effect variable with said relative humidity.

4. A combination as specified in claim 3, wherein said input of said measuring apparatus includes first and second input connections, and wherein said connecting means comprises a connection between one of said conductors of said sensing circuit and one of said conductors of said compensating circuit, a connection between the other of said conductors of said sensing circuit and one of said input connections, and a connection between the other of said conductors of said compensating circuit and the other of said input connections.

5. In combination, relative humidity sensing apparatus responsive both to the relative humidity and to the temperature to which it is exposed, the response of said apparatus to said temperature varying with changes in said relative humidity, a sensing circuit including said apparatus and having a pair of conductors between which there is developed a first electrical effect including a relative humidity component varying with said relative humidity and a temperature component varying with said temperature and with said relative humidity, a thermometric resistor responsive to said temperature, a compensating circuit including said resistor and having circuit points between which there is developed a second electrical effect varying with said temperature, said compensating circuit also including a pair of conductors, adjustable means connected in said compensating circuit between said circuit points and the last mentioned conductors and arranged to be adjusted in accordance with said relative humidity and to apply between said last mentioned conductors a compensating electrical effect derived from said second electrical effect and including a temperature component varying with said temperature and a relative humidity component varying with said relative humidity, electrical measuring apparatus having an input, and connecting means to oppose said compensating electrical effect to said first electrical effect in said input of said measuring apparatus for the substantially complete cancellation of said temperature component of said first electrical effect by said compensating electrical effect, said measuring apparatus thereby responding solely to said relative humidity component of said first electrical effect.

6. A combination as specified in claim 5, wherein said input of said measuring apparatus includes first and second input connections, and wherein said connecting means comprises a connection between one of said conductors of said sensing circuit and one of said conductors of said compensating circuit, a connection between the other of said conductors of said sensing circuit and one of said input connections, and a connection between the other of said conductors of said compensating circuit and the other of said input connections.

7. A combination as specified in claim 5, wherein said measuring apparatus includes an element adjusted in accordance with the resultant of said first and compensating electrical effects in said input of said measuring apparatus, and hence in accordance with said relative humidity, and wherein said adjustable means of said compensating circuit is connected to said element for adjustment in accordance with said adjustment of said element.

8. A combination as specified in claim 7, wherein said input of said measuring apparatus includes first and second input connections, and wherein said connecting means comprises a connection between one of said conductors of said sensing circuit and one of said conductors of said compensating circuit, a connection between the other of said conductors of said sensing circuit and one of said input connections, and a connection between the other of said conductors of said compensating circuit and the other of said input connections.

9. An arrangement for measuring relative humidity comprising a sensing circuit including apparatus varying in resistance in response to changes in the relative humidity and to changes in the temperature to which it is exposed and having a relatively high minimum resistance and including a first dropping resistor connected in series with said apparatus and having a relatively low resistance, first energizing means connected to said sensing circuit and arranged to produce a current flow through said apparatus and said resistor, a compensating circuit including a second dropping resistor and a thermometric resistor exposed to said changes in temperature, second energizing means connected to said compensating circuit and arranged to produce a current flow through said thermometric resistor and said second dropping resistor including a constant component and a variable component varying with said temperature, third energizing means connected to said compensating circuit and arranged to produce therein a current flow in opposition to said current flow through said second dropping resistor and of a magnitude to effect the substantially complete neutralization of said constant component, and a measuring circuit connected across said first and second dropping resistors with the potential drop of one of said dropping resistors opposed to the potential drop of the other of said dropping resistors, said measuring circuit being responsive to the algebraic sum of said potential drops in said first and second dropping resistors, and hence being responsive to said changes in said relative humidity.

10. An arrangement as specified in claim 9, wherein the response of said apparatus to changes in said temperature is varied by changes in said relative humidity, wherein said compensating circuit includes variable means connected to said second dropping resistor and arranged to be varied in accordance with said changes in said relative humidity and to vary said variable component also in accordance with changes in said relative humidity, and wherein said variable component is operative to produce a potential drop in said second dropping resistor which substantially completely opposes the potential drop in said first dropping resistor due to the response of said apparatus to changes in said temperature.

11. A relative humidity measuring arrangement comprising a relative humidity sensing circuit including sensing apparatus which increases and decreases in resistance as the relative humidity to which the apparatus is exposed respectively decreases and increases and as the temperature of the apparatus respectively decreases and increases, a first source of current, a dropping resistor connected in series with said apparatus across said first source of current, a compensating circuit including a thermometric resistor changing in resistance as said temperature changes, a second source of current, a first slide wire resistor connected in series with said thermometric resistor across said second source of current and having one end connected to one end of said dropping resistor, a first wiper contact engaging and adjustable along said first slide wire resistor, a potentiometric measuring circuit including a third source of current and a second slide wire resistor connected across said third source of current, a second wiper contact engaging and adjustable along said second slide wire resistor, an electronic amplifier having an input circuit connected and responsive to signals between the second end of said dropping resistor and said potentiometric circuit at a point displaced from the portion of said second slide wire resistor engaged by said second wiper contact, a conductor connecting said first and second wiper contacts, and a rebalancing motor actuated by said amplifier in accordance with signals applied to said input circuit to make simultaneous correction adjustments of said first and second wiper contacts, whereby the position along said second slide wire resistor into which said second wiper contact is adjusted by said rebalancing motor, constitutes a measure of the relative humidity to which said apparatus is exposed.

12. An arrangement as specified in claim 11, wherein said sources of current are transformer windings adapted to supply alternating current of the same frequency.

13. An arrangement as specified in claim 11, wherein said sensing apparatus comprises a plurality of relative humidity sensing units, each of which comprises a separate ballast resistor and a separate relative humidity responsive resistor connected in series, and wherein said units are connected in parallel with each other in the series circuit including said dropping resistor and said first source of current.

14. An arrangement as specified in claim 11, wherein the current supplied by said sources of current is an alternating current, wherein said sensing apparatus includes at least one relative humidity sensing unit comprising a relative humidity responsive resistor and a ballast resistor connected in series therewith, said responsive resistor having a minimum operative resistance which is many times greater than the resistance of said dropping resistor and which is substantially smaller than the resistance of said ballast resistor, and wherein said sensing apparatus and said thermometric resistor are adapted to be located at a distance from the remainder of said arrangement and are connected thereto by shielded conductor means, the latter comprising a first shielded conductor connecting one end of said thermometric resistor to said second source of current and including a shield connecting the second end of said thermometric resistor and one terminal of said sensing apparatus to said one end of said dropping resistor, and a second shielded conductor connecting the second terminal of said sensing apparatus to said first source of current and including a shield connected to said second end of said dropping resistor through a connection adapted to be connected to ground, whereby said responsive resistor and said ballast resistor are connected in series between said second shielded conductor and said shield of said first shielded conductor.

15. An arrangement as specified in claim 14, wherein said sensing apparatus includes a plurality of said sensing units, and wherein the series connected responsive resistor and ballast resistor of each of said sensing units is connected in parallel with the others of said sensing units between said second shielded conductor and said shield of said first shielded conductor.

16. Apparatus for measuring relative humidity comprising a first circuit including humidity sensing apparatus varying in resistance in response to changes in the temperature to which it is exposed and in response to changes in the relative humidity to which it is exposed, a first source of alternating current, a first resistor of lower resistance than said sensing apparatus connected in series with the latter in a first circuit across said first source of alternating current, a temperature compensating circuit including a thermometric resistor exposed to and varying in resistance in response to changes in the temperature to which said sensing apparatus is exposed, a second source of alternating current connected in series with said thermometric resistor and tending to produce a current flow through the latter including a constant current component and a variable current component varying with said temperature, a neutralizing circuit also connected in series with said second source and thermometric resistor and including a third source of alternating current and compensating resistance connected across said third current source, said first, second, and third current sources being adapted to supply alternating current of the same frequency and in predetermined phase relation, the resistances of said thermometric resistor and compensating resistance being so related to one another and to the voltages of said second and third current sources that the current flow in said neutralizing circuit substantially prevents flow of said constant current component through said compensating resistance, and measuring apparatus having an input circuit connected to said first and neutralizing circuits and arranged to measure the algebraic sum of the voltage drop in a regulable portion of said compensating resistance and the voltage drop in said first resistor.

17. Apparatus as specified in claim 16, wherein each of said sources of alternating current is a transformer winding adapted to be energized from a source of alternating current of said frequency and adapted, when so energized, to supply alternating current of said frequency to said apparatus.

18. Apparatus as specified in claim 16, wherein changes in said relative humidity modify the resistance-temperature characteristic response of said sensing apparatus, and wherein there is included adjustable means actuated by said measuring apparatus for varying the said regulable portion of said compensating resistance as required to maintain the voltage drop therein equal in magnitude to the component of the voltage drop in said first resistor which is the result of the response of said sensing apparatus to temperature changes, whereby said measuring apparatus is operative to provide a measure of the relative humidity to which said sensing apparatus is exposed which is unaffected by the temperature of said sensing apparatus.

19. Apparatus as specified in claim 18, wherein said measuring apparatus includes potentiometric means and a motor means operative to adjust said potentiometric means in accordance with said algebraic sum of said voltage drops, and wherein said motor means is operative to adjust said adjustable means simultaneously with the adjustment of said potentiometric means.

References Cited in the file of this patent

UNITED STATES PATENTS

| | | |
|---|---|---|
| 2,166,935 | Adams | July 25, 1939 |
| 2,329,841 | Keinath | Sept. 21, 1943 |
| 2,366,694 | Bender | Jan. 9, 1945 |

FOREIGN PATENTS

| | | |
|---|---|---|
| 533,381 | Great Britain | Feb. 12, 1941 |